US012803187B2

(12) United States Patent
Chen

(10) Patent No.: US 12,803,187 B2
(45) Date of Patent: Nov. 17, 2026

(54) PIERCING TYPE MOTOR TERMINAL CONNECTOR

(71) Applicant: Chun-Jui Chen, Tainan (TW)

(72) Inventor: Chun-Jui Chen, Tainan (TW)

( * ) Notice: Subject to any disclaimer, the term of this patent is extended or adjusted under 35 U.S.C. 154(b) by 373 days.

(21) Appl. No.: 18/611,368

(22) Filed: Mar. 20, 2024

(65) Prior Publication Data

US 2025/0079726 A1 Mar. 6, 2025

(30) Foreign Application Priority Data

Aug. 31, 2023 (CN) ......................... 202322348691.1

(51) Int. Cl.
*H01R 4/2445* (2018.01)
*H01R 4/2425* (2018.01)

(52) U.S. Cl.
CPC ......... *H01R 4/2445* (2013.01); *H01R 4/2425* (2013.01)

(58) Field of Classification Search
CPC ...... H01R 4/2425; H01R 4/2445; H01R 4/24; H01R 4/2462; H01R 12/585; H01R 13/112; H01R 13/15
USPC ................................ 439/395, 397, 401, 404
See application file for complete search history.

(56) References Cited

U.S. PATENT DOCUMENTS

| | | | | |
|---|---|---|---|---|
| 8,708,733 B2 * | 4/2014 | Parrish | H01R 4/242 | 439/395 |
| 2006/0246767 A1 * | 11/2006 | Suzuki | H01R 43/01 | 439/395 |
| 2016/0181710 A1 * | 6/2016 | Eakins | H01R 12/585 | 29/842 |
| 2023/0253725 A1 * | 8/2023 | Rosan | H01R 12/585 | 439/816 |

FOREIGN PATENT DOCUMENTS

| | | | |
|---|---|---|---|
| CN | 208939152 U | * | 6/2019 |
| CN | 219144504 U | * | 6/2023 |

OTHER PUBLICATIONS

English translation for CN 208939152 (Year: 2026).*
English translation of CN208939152 (Year: 2026).*
English translation of CN219144504 (Year: 2026).*

* cited by examiner

*Primary Examiner* — Tho D Ta
*Assistant Examiner* — Carlos E Lopez-Pagan

(57) ABSTRACT

A piercing-type motor terminal connector includes a plate-like main body having a board end and a wiring end. First and second elastic arms define a main clamping groove and carry first and second serrations for piercing enamel of an enameled wire. In one embodiment, third and fourth elastic arms define a secondary clamping groove carrying additional serrations, and the main and secondary clamping grooves clamp the same wire at positions spaced along the wire axis. In another embodiment, elongated elastic holes extend through the first and second elastic arms parallel to the main clamping groove. A pin at the board end provides board connection.

11 Claims, 7 Drawing Sheets

PIERCING TYPE MOTOR TERMINAL CONNECTOR

CROSS REFERENCE TO RELATED APPLICATION

The present application claims priority to CN Patent application No. 2023223486911, filed on Aug. 31, 2023, which is hereby incorporated by reference in their entirety.

FIELD

This disclosure relates to the field of electrical connectors, specifically to a piercing-type of motor terminal connector.

BACKGROUND

Piercing-type motor terminal connectors are connected to wires through soldering, riveting, or piercing methods. Particularly, the piercing connection method, which involves breaking the outer enamel coating of enameled wires to make direct contact with the metal inside, achieves one-time crimping and conductivity. This method is convenient, quick, time-saving, and labor-saving, and therefore widely adopted. Piercing-type connections are made by puncturing the enamel coating of enameled wires, establishing an electrical connection between the terminal and the conductor. Enameled wires consist of an outer enamel coating and an inner conductor. However, existing terminals primarily penetrate the enameled wire by using protruding teeth or blade-like cuts to insert into the wire, piercing through the enamel coating. Although these methods can puncture the enamel coating and block the enamel coating outside of the terminal, there are often residual enamel fragments that hinder the full insertion of the terminal into the wire, causing incomplete contact between the terminal and a conductor. Moreover, after piercing, the contact retention is insufficient, and the terminal is prone to unreliable electrical contact or failure due to vibration.

SUMMARY OF THE DISCLOSURE

The objective of this utility is to provide a piercing-type motor terminal connector that satisfies piercing connections and enhances the reliability of the electrical connection between the terminal and the conductor.

To achieve the above objective, this utility adopts the following technical solution:

A piercing-type motor terminal connector, characterized in that it comprises a main body, the main body being a plate-like structure and having a board end and a wiring end facing away from each other, where the board end is disposed with a pin for board connection, the wiring end includes a first elastic arm and a second elastic arm aligned side by side, and between the first elastic arm and the second elastic arm, a main clamping groove is formed capable of establishing an adjustable tension state based on the elasticity of the first and second clastic arms; a first serration is disposed on the first elastic arm at the entrance of the main clamping groove and a second serration is disposed on the second elastic arm at the entrance of the main clamping groove, the first serration and the second serration for pressing and piercing the enamel of enameled wire to allow the enameled wire to slide into the main clamping groove and be held by the first and second elastic arms, forming an electrical connection; and a force-enhancing part is disposed on both the first and second clastic arms to increase the clamping force when the enameled wire enters the main clamping groove.

In some embodiments, The force-enhancing part on the first elastic arm is a third elastic arm extending from one end of the first clastic arm and bent to form, the third elastic arm and the first elastic arm establishing a sequential layering along the axial direction of the enameled wire; the force-enhancing part on the second elastic arm is a fourth elastic arm extending from one end of the second elastic arm and bent to form, the fourth elastic arm and the second elastic arm establishing a sequential layering along the axial direction of the enameled wire; the third elastic arm and the fourth elastic arm together enclose to form a secondary clamping groove capable of establishing an adjustable tension state based on the elasticity of the third elastic arm and the fourth elastic arm, whereby the secondary clamping groove and the main clamping groove forming a sequential wire-clamping relationship in the axial direction of the enameled wire.

In some embodiments, the third elastic arm and the fourth elastic arm are connected at the bottom of the secondary clamping groove; and in the connection area of the third elastic arm and the fourth elastic arm, a folded-back section extending towards the main body, with the extended end of the folded-back section overlapping onto the main body.

In some embodiments, a third serration is disposed on the third elastic arm at the entrance of the secondary clamping groove, and a fourth serration is disposed on the fourth elastic arm at the entrance of the secondary clamping groove, whereby the third serration and the fourth serration used to press and pierce the enamel of enameled wire, enabling the enameled wire to slide into the secondary clamping groove and be held by the third elastic arm and the fourth elastic arm, thereby forming an electrical connection.

In some embodiments, the force-enhancing part on the first elastic arm is a first elastic hole located within and passing through the first elastic arm, and the force-enhancing part on the second elastic arm is a second elastic hole located within and passing through the second elastic arm; the first elastic hole and the second elastic hole are elongated, and the holes extend parallel to the main clamping groove, where the first elastic hole and the second elastic hole symmetrically positioned referred by the central axis of the main clamping groove, and the corresponding edges of the first elastic hole and the second elastic hole being aligned with the bottom of the main clamping groove.

In some embodiments, the pin is of a fish-eye form, with an expansion section located inside the pin, where the expansion section is either a recess or a through-hole passing through the pin.

In some embodiments, there are two pins symmetrically arranged about the central axis of the main clamping groove.

DETAILED DESCRIPTION

Figure 1:
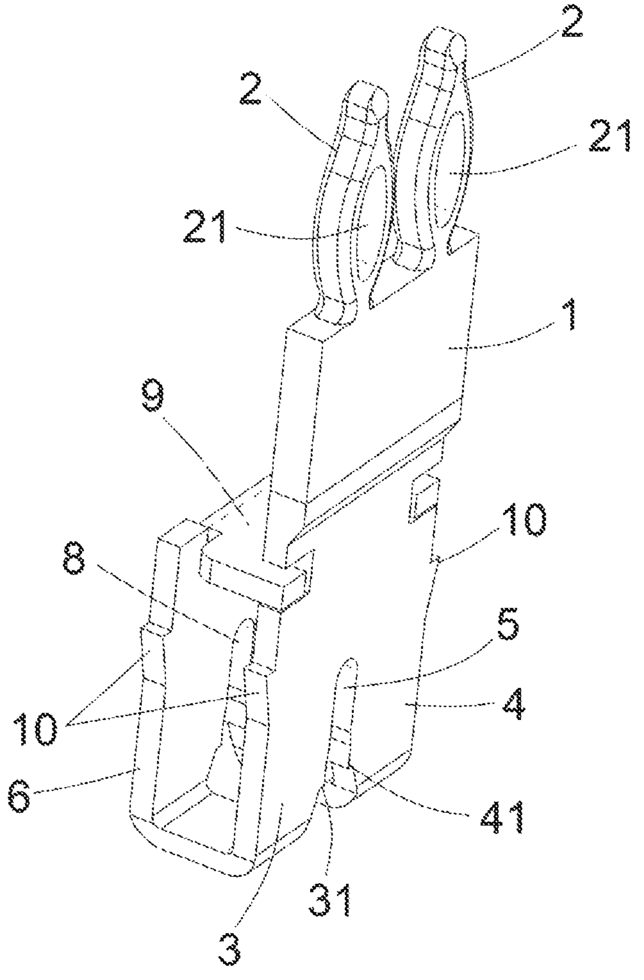
FIG. 1 is a schematic diagram of a structure for one embodiment of this disclosure.

The following description, in conjunction with the accompanying drawings, further explains the conception, specific structure, and technical effects of this utility model, to fully understand its objectives, features, and effects.

It should be noted that in the description of this disclosure, terms indicating direction or positional relationships such as "upper", "lower", "left", "right", "vertical", "horizontal", "inner", "outer", etc., are based on the directions or positional relationships shown in the drawings. These terms are used merely for convenience in description and do not imply that the described devices or elements must have a specific orientation, be constructed and operated in a specific orientation, and therefore should not be considered as limiting to this disclosure. Moreover, terms like "first", and "second" are used only for descriptive purposes and should not be construed as indicating or implying relative importance.

Figure 2:
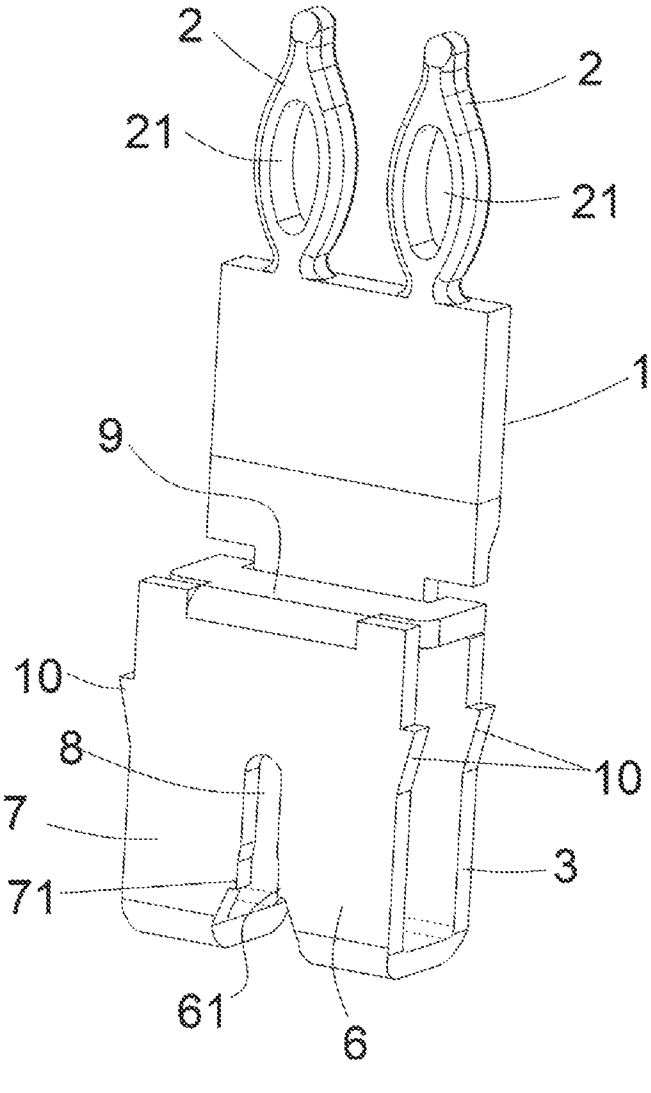
FIG. 2 is a front view schematic diagram of the embodiment shown in FIG. 1.
Figure 3:
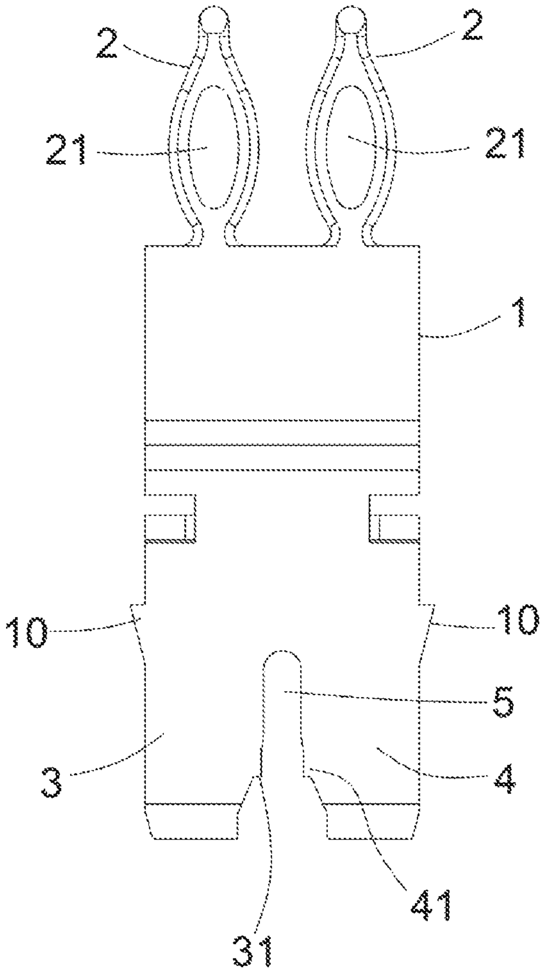
FIG. 3 is a schematic diagram of another perspective of the embodiment shown in FIG. 1.
Figure 4:
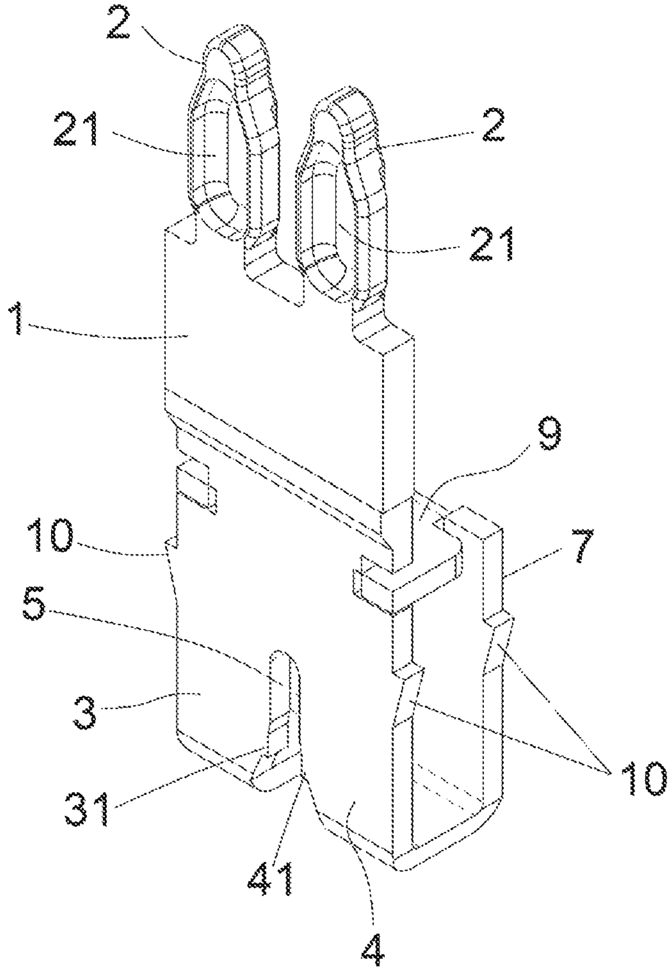
FIG. 4 is a schematic diagram of a structure for a second embodiment of this disclosure.
Figure 5:
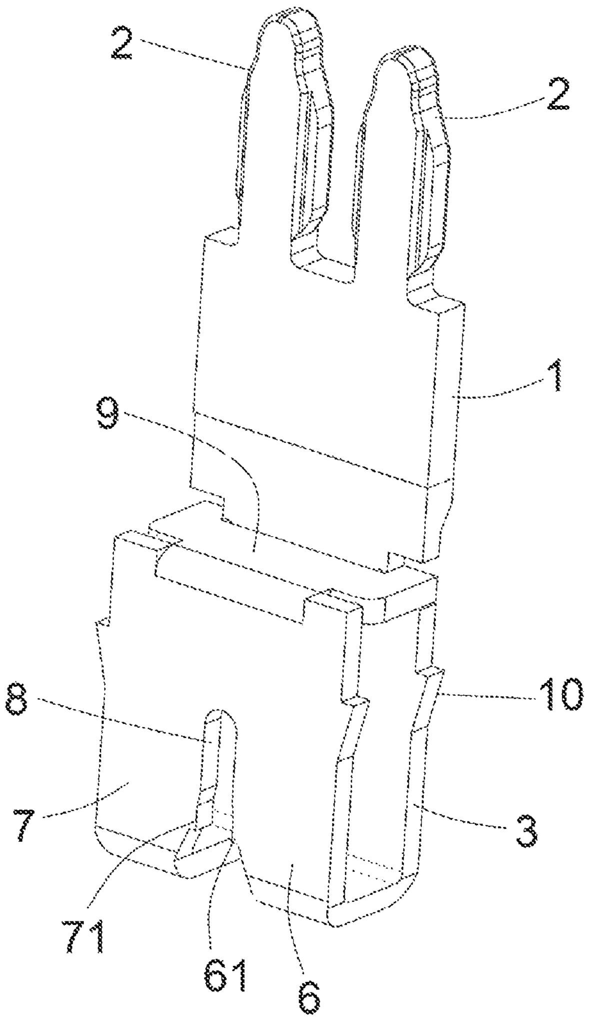
FIG. 5 is a schematic diagram of another perspective of the embodiment shown in FIG. 4.
Figure 6:
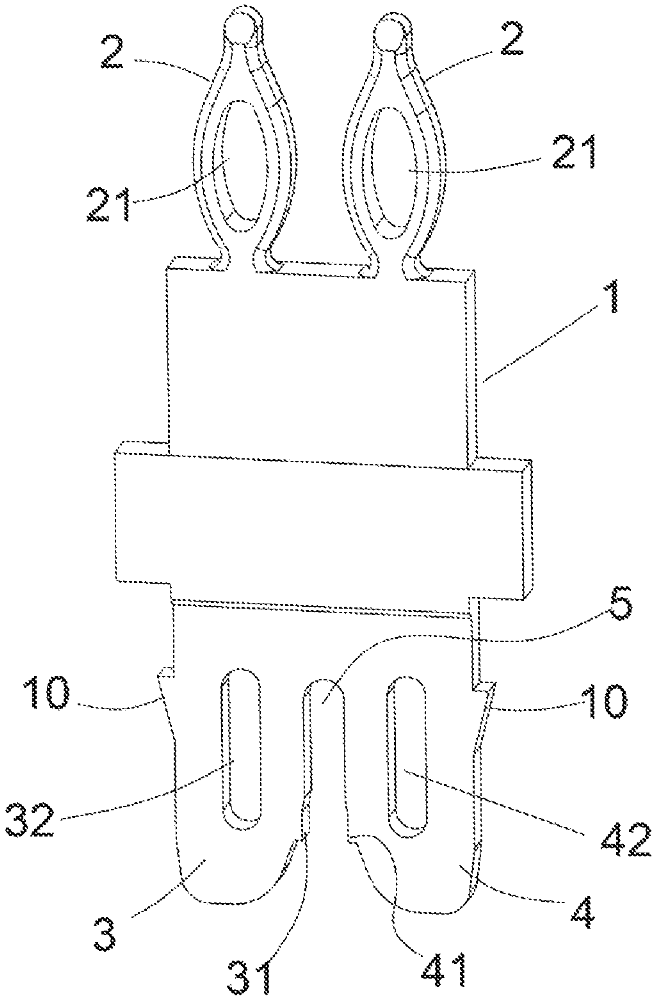
FIG. 6 is a schematic diagram of a structure for a third embodiment of this disclosure.
Figure 7:
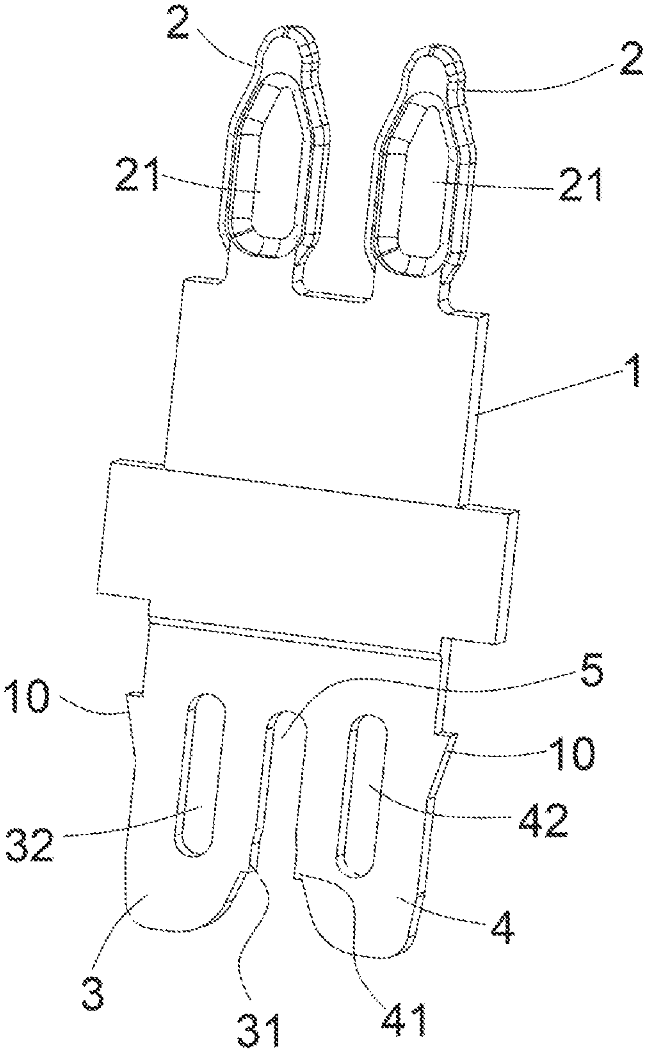
FIG. 7 is a schematic diagram of a structure for a fourth embodiment of this disclosure.

According to FIGS. 1-7, these are schematic diagrams of preferred embodiments of this disclosure. This disclosure relates to a piercing-type motor terminal connector, which includes a main body 1. The main body 1 is a plate-like structure with a board end and a wiring end which faces away from each other for board-to-wire connections. During use, the wiring end is coupled with a corresponding plastic case (not shown in the figure) for wiring. When inserted into the plastic case, the wiring end directly contacts the metal inside the enameled wire after breaking its outer enamel coating, achieving one-time crimping and electrical conductivity. The wiring end is disposed of a first elastic arm 3 and a second clastic arm 4 aligned side by side, forming a main clamping groove 5 between them that establishes an adjustable tension state based on the elasticity of the first and second elastic arms. A first serration 31 and a second serration 41 are disposed at the entrance of the main clamping groove 5, used for pressing and piercing the enamel of the enameled wire, allowing the wire to slide into the main clamping groove 5 and be held by the first and second elastic arms, thus forming an electrical connection. As shown, the main clamping groove 5 extends from the wiring end towards the board end and is designed with a flared entrance to facilitate the insertion of the enameled wire. The first serration 31 and the second serration 41 are symmetrically arranged on the left and right sides in the direction of wire insertion (the direction of introducing the enameled wire). When the enameled wire is pressed into the main clamping groove 5, the first serration 31 and the second serration 41 pierce and scrape off the corresponding enamel, exposing the metal inside the wire and pushing away the enamel, which does not affect the subsequent electrical connection. This facilitates the sliding of the enameled wire into the main clamping groove 5 to be held by the first and second clastic arms, achieving one-time crimping and electrical connection. At the same time, it saves time and effort without increasing connection costs, reduces installation processes, improves installation efficiency, and saves installation space. As the figures show, the distance between the first serration 31 and the second serration 41 is greater than the distance between the left and right side walls of the wire-clamping area inside the main clamping groove 5. After the enameled wire slides into the main clamping groove 5, it further compresses and expands the groove. At this point, the first and second elastic arms, through their elasticity, allow the main clamping groove 5 to adaptively close, achieving the holding of the enameled wire by the first and second elastic arms and forming an electrical connection. In this embodiment, the first clastic arm 3 and the second clastic arm 4 are also disposed with force-enhancing parts, which increase the clamping force of the first elastic arm 3 and the second elastic arm 4 when the enameled wire slides into the main clamping groove 5, further enhancing connection stability, preventing poor electrical contact between the terminal and the enameled wire due to vibrations, and improving performance.

In this embodiment, the board end are disposed with pins 2 for board connection. Preferably, the pins 2 are of a fish-eye form. As shown in the figures, there are two pins 2 symmetrically arranged about the central axis of the main clamping groove 5, providing multiple points for board connection, ensuring stable connection, and facilitating the crimping of the enameled wire by the main clamping groove 5. This embodiment also includes an expansion section 21 inside the pins 2. Preferably, this expansion section 21 is either a recess or a through-hole passing through the pin 2. As shown in FIGS. 1, 2, 3, and 6, the expansion section 21 is a through-hole passing through the pin 2, while in FIGS. 4, 5, and 7, the expansion section 21 is in the form of a recess. Similarly, utilizing the expansion and contraction properties of the expansion section 21, it is advantageous for inserting the pins 2 into a PCB board and can significantly reduce the stress on the PCB board connection holes, maintain constant terminal orthogonality, enhance the stability of the connection, and reduce the need for soldering processes.

According to FIGS. 1, 2, 3, 4, and 5, the embodiment described a force-enhancing part on the first elastic arm 3, which is a third elastic arm 6 extending and bending from one end of the first elastic arm 3. The third elastic arm 6 and the first clastic arm 3 form a sequential layering relationship along the axial direction of the enameled wire. The force-enhancing part on the second elastic arm 4 is a fourth elastic arm 7, extending and bending from one end of the second elastic arm 4, and the fourth elastic arm 7 and the second elastic arm 4 also establish a sequential layering relationship along the axial direction of the enameled wire. A secondary clamping groove 8 is formed between the third elastic arm 6 and the fourth elastic arm 7, capable of establishing an adjustable tension state based on the elasticity of the third and fourth elastic arms, where the secondary clamping groove 8 forms a sequential wire-clamping relationship with the main clamping groove 5 in the axial direction of the enameled wire. This structure, through its extended construction, increases the thickness of the wiring end, enhancing the mechanical strength of the structure and preventing deformation of the wiring end. This improves the assembly stability of the wiring end when inserted into the corresponding plastic case and facilitates the crimping of the enameled wire, obtaining greater expansion and contraction elasticity. This enhances the clamping force of the first elastic arm 3 and the second elastic arm 4, increasing connection stability, preventing poor electrical contact between the terminal and the enameled wire due to vibrations, and enhancing performance and safety. Additionally, the secondary clamping groove 8 clamps the wire in conjunction with the main clamping groove 5, forming a front-and-back sequential wire-clamping relationship in the axial direction of the enameled wire, which enhances the assembly stability of the enameled wire, ensuring it is not easily loosened and securing the electrical connection.

Further, the third clastic arm 6 and the fourth elastic arm 7 are connected together at the bottom of the secondary clamping groove 8, and in the interconnected area of the third elastic arm 6 and the fourth elastic arm 7, there is a folded-back section 9 extending towards the main body 1. The extended end of this folded-back section 9 overlaps onto the main body 1, forming a continuous loop-like structure when viewed from the side, making the overall structure stable and resistant to deformation, thus increasing the clamping force of the first elastic arm 3 and the second elastic arm 4. In this embodiment, the structural forms of the third elastic arm 6 and the fourth elastic arm 7 are consistent with those of the first clastic arm 3 and the second clastic arm 4, allowing for complete overlap in the orthographic projection direction, which facilitates manufacturing and assembly. The terminal of this embodiment can be manufactured as an integrated structure by stamping, meeting the structural design requirements for high current. As shown in the figures, barbs 10 are also provided on the outer surfaces of the first elastic arm 3, the second elastic arm 4, the third elastic arm 6, and the fourth elastic arm 7. When the wiring end is inserted into the corresponding plastic case, the barbs 10 latch onto the plastic case, effectively preventing the terminal from retreating or falling out after being installed in the mounting groove of the plastic case, serving as anti-retreat and anti-fall features.

Furthermore, the third elastic arm 6 at the entrance of the secondary clamping groove 8 is equipped with a third serration 61, and the fourth clastic arm 7 at the entrance of the secondary clamping groove 8 is equipped with a fourth serration 71. The third serration 61 and the fourth serration 71 are used to press and pierce the enamel of the enameled wire, enabling the wire to slide into the secondary clamping groove 8 and be held by the third and fourth elastic arms, thereby forming an electrical connection. This structure not only satisfies the holding requirements but also further enhances the piercing and conducting connections, ensuring the effectiveness and stability of the electrical connections, and increases the contact area to meet the requirements of high current operation Referring to FIGS. 6 and 7, an alternative design for the force-enhancing part of this utility model is presented. The force-enhancing part on the first elastic arm 3 is a first clastic hole 32 located within and passing longitudinally through the first elastic arm 3. Similarly, the force-enhancing part on the second elastic arm 4 is a second elastic hole 42 located within and passing longitudinally through the second elastic arm 4. Both the first elastic hole 32 and the second elastic hole 42 are elongated and extend parallel to the main clamping groove 5. The first elastic hole 32 and the second elastic hole 42 are symmetrically positioned about the central axis of the main clamping groove 5, and their corresponding ends are aligned with the bottom of the main clamping groove 5. During assembly and use, the deformation of the first and second elastic holes 32, 42 generates elasticity, thereby increasing the clamping force of the first elastic arm 3 and the second elastic arm 4, enhancing connection stability, preventing poor electrical contact between the terminal and the enameled wire due to vibrations, and improving performance.

This utility model provides a motor terminal connector suitable for board-to-wire connections, with pins designed for easy board insertion. The wiring end features a first elastic arm and a second elastic arm, which together form a main clamping groove capable of establishing an adjustable tension state based on the elasticity of the first and second elastic arms. At the entrance of the main clamping groove, first and second serrations are placed, used for pressing and piercing the enamel of the enameled wire, allowing the wire to slide into the groove and be held by the first and second elastic arms, thus forming an electrical connection. This satisfies the requirements for piercing and installing enameled wires, achieving one-time crimping and conductivity, making installation time and labor-efficient. Simultaneously, force-enhancing parts are equipped on both the first and second elastic arms, which, when the enameled wire slides into the main clamping groove, increase the clamping force of the arms, further enhancing connection stability, preventing poor electrical contact between the terminal and the conductor due to vibrations, and improving performance.

Although the preferred specific embodiments of this utility model have been described in conjunction with the accompanying drawings, the utility model should not be limited to the exact structure and operation fully identical to the description and drawings. For those skilled in the art, logical analysis, reasoning, or limited experimentation can lead to many equivalent modifications and variations to the aforementioned embodiments without departing from the conception and scope of this utility model, and these modifications and variations should fall within the scope of protection demanded by this utility model.

The invention claimed is:

1. A piercing-type motor terminal connector, characterized in that it comprises a main body (1), the main body (1) being a plate-like structure and having a board end and a wiring end facing away from each other, where the board end is disposed with a pin (2) for board connection, the wiring end includes a first elastic arm (3) and a second elastic arm (4) aligned side by side, and between the first elastic arm (3) and the second elastic arm (4), a main clamping groove (5) is formed capable of establishing an adjustable tension state based on the elasticity of the first elastic arm and the second elastic arm;

a first serration (31) is disposed on the first elastic arm (3) at the entrance of the main clamping groove (5) and a second serration (41) is disposed on the second elastic arm (4) at the entrance of the main clamping groove (5), the first serration (31) and the second serration (41) for pressing and piercing the enamel of an enameled wire to allow the enameled wire to slide into the main clamping groove and be held by the first elastic arm and the second elastic arm, forming an electrical connection;

a third elastic arm (6) extending from one end of the first elastic arm (3) and bent relative to the first elastic arm (3), the third elastic arm (6) and the first elastic arm (3) being sequentially layered along an axial direction of the enameled wire;

a fourth elastic arm (7) extending from one end of the second elastic arm (4) and bent relative to the second elastic arm (4), the fourth elastic arm (7) and the second elastic arm (4) being sequentially layered along the axial direction of the enameled wire;

the third elastic arm (6) and the fourth elastic arm (7) defining a secondary clamping groove (8), the secondary clamping groove (8) being capable of establishing an adjustable tension state based on elasticity of the third elastic arm (6) and the fourth elastic arm (7);

the secondary clamping groove (8) being configured to clamp the enameled wire in conjunction with the main clamping groove (5), the secondary clamping groove (8) and the main clamping groove (5) forming a front-and-back sequential wire-clamping relationship along the axial direction of the enameled wire;

a third serration (61) located on the third elastic arm (6) at an entrance of the secondary clamping groove (8) and a fourth serration (71) located on the fourth elastic arm (7) at the entrance of the secondary clamping groove (8), the third serration (61) and the fourth serration (71) being configured to press and pierce the enamel of the same enameled wire to allow the enameled wire to enter the secondary clamping groove (8) and be held by the third elastic arm (6) and the fourth elastic arm (7), thereby forming an electrical connection;

wherein the first and second serrations (31, 41) and the third and fourth serrations (61, 71) are arranged at respective positions spaced apart along the axial direction of the enameled wire; and wherein the main clamping groove (5) includes a wire-clamping area having opposite sidewalls, and a distance between the first serration (31) and the second serration (41) is greater than a distance between the opposite sidewalls of the wire-clamping area.

2. The piercing-type motor terminal connector according to claim 1, characterized in that the third elastic arm (6) and the fourth elastic arm (7) are connected at the bottom of the secondary clamping groove (8); and a folded-back section (9) extends toward the main body (1) from a connection area of the third elastic arm (6) and the fourth elastic arm (7), and an extended end of the folded-back section (9) overlaps the main body (1), wherein the folded-back section (9) and the main body (1) define a continuous loop-like structure when viewed from a side of the connector.

3. The piercing-type motor terminal connector according to claim 1, characterized in that there are two pins (2) symmetrically arranged about the central axis of the main clamping groove (5).

4. The piercing-type motor terminal connector of claim 1, wherein the third elastic arm (6) and the fourth elastic arm (7) are connected to each other at a bottom of the secondary clamping groove (8).

5. The piercing-type motor terminal connector of claim 1, wherein the third elastic arm (6) and the fourth elastic arm (7) have structural forms corresponding to those of the first elastic arm (3) and the second elastic arm (4), respectively, and completely overlap the first elastic arm (3) and the second elastic arm (4), respectively, in an orthographic projection direction.

6. The piercing-type motor terminal connector of claim 1, wherein each of the first elastic arm (3), the second elastic arm (4), the third elastic arm (6), and the fourth elastic arm (7) includes a barb (10) on an outer surface thereof.

7. The piercing-type motor terminal connector according to claim 1, characterized in that the pin (2) is of a fish-eye form, with an expansion section (21) located inside the pin (2), where the expansion section (21) is either a recess or a through-hole passing through the pin (2).

8. The piercing-type motor terminal connector according to claim 7, characterized in that there are two pins (2) symmetrically arranged about the central axis of the main clamping groove (5).

9. A piercing-type motor terminal connector, characterized in that it comprises:

a main body (1), the main body (1) being a plate-like structure and having a board end and a wiring end facing away from each other, the board end being disposed with a pin (2) for board connection, and the wiring end including a first elastic arm (3) and a second elastic arm (4) aligned side by side;

a main clamping groove (5) formed between the first elastic arm (3) and the second elastic arm (4), the main clamping groove (5) being capable of establishing an adjustable tension state based on elasticity of the first elastic arm (3) and the second elastic arm (4);

a first serration (31) disposed on the first elastic arm (3) at an entrance of the main clamping groove (5) and a second serration (41) disposed on the second elastic arm (4) at the entrance of the main clamping groove (5), the first serration (31) and the second serration (41) being configured to press and pierce enamel of an enameled wire to allow the enameled wire to enter the main clamping groove (5) and be held by the first elastic arm (3) and the second elastic arm (4), thereby forming an electrical connection;

a first elastic hole (32) located within and passing through the first elastic arm (3); and a second elastic hole (42) located within and passing through the second elastic arm (4), wherein the first elastic hole (32) and the second elastic hole (42) are elongated and extend parallel to the main clamping groove (5), wherein the first elastic hole (32) and the second elastic hole (42) are symmetrically positioned about a central axis of the main clamping groove (5), and corresponding ends of the first elastic hole (32) and the second elastic hole (42) are aligned with a bottom of the main clamping groove (5), and wherein the main clamping groove (5) includes a wire-clamping area having opposite sidewalls, and a distance between the first serration (31) and the second serration (41) is greater than a distance between the opposite sidewalls of the wire-clamping area.

10. The piercing-type motor terminal connector according to claim 9, characterized in that the connector comprises two pins (2) symmetrically arranged about the central axis of the main clamping groove (5), each of the two pins (2) being of a fish-eye form and including an expansion section (21).

11. The piercing-type motor terminal connector according to claim 10, characterized in that the expansion section (21) of each of the two pins (2) is a recess.

* * * * *